Patented June 11, 1929.

1,717,105

UNITED STATES PATENT OFFICE.

HERMANN HIRZEL, OF ZURICH, SWITZERLAND, ASSIGNOR TO SHARP AND DOHME, INC., OF BALTIMORE, MARYLAND, A CORPORATION OF NEW JERSEY.

PROCESS FOR PREPARING HEXYLRESORCINOL.

No Drawing. Application filed March 4, 1926, Serial No. 92,349, and in Switzerland March 10, 1925.

The subject of this invention is a new process for preparing hexylresorcinol, which is a valuable chemical compound for therapeutic purposes. As starting material resorcinol is used and this is reacted upon which hexyl alcohol in the presence of a condensing agent, such as zinc chloride, sulfuric acid, etc., or with a hexylhalogenide with or without a catalyst, such as zinc, copper, etc.

The invention will be illustrated by the following specific examples, but the invention is not limited thereto.

Example 1.

200 grams zinc chloride are dissolved by warming in 150 grams hexyl alcohol and 110 grams resorcinol are added. In a vessel with a reflux condenser the resulting mixture is heated up until the reaction is finished. The hexyl alcohol not reacted upon is distilled off with steam and the residue washed with water. The oily reaction mixture is then purified, perferably by vacuum distillation; there is thus obtained hexyl resorcinol.

The condensation might be performed also in such a manner, that the water formed by the reaction is distilled off continuously.

The quantities used and the conditions of performing the reaction above mentioned, including the means of purifications, above mentioned, give good results, but they might be varied within wide limits and the ingredients compounded might be added in a different order.

In place of zinc chloride other condensing agents might be used, such as sulfuric acid etc., with corresponding change in the process.

Example 2.

5 parts of zinc, 70 parts of hexyl chloride and 55 parts of resorcinol are heated in a vessel supplied with a reflux condenser until the splitting off of hydrochloric acid is finished. The reaction mixture is washed with water and diluted acid; the oil is separated and dissolved in benzol or any other suitable solvent. The solution is filtered, when necessary, dried and the solvent is distilled off. The residue is purified, preferably by vacuum distillation, and hexyl resorcinol is thus obtained.

The reaction might be performed without a catalyst or the zinc might be replaced by copper etc.

The quantities, reagents and the conditions of performing the reaction, including the means of purification, give good results, but they might be varied within wide limits and the ingredients compounded might be added in a different order.

In the claims "nuclear condensation catalyst" is used to denote a catalyst which will promote this reaction, in which an alkyl group is added to an aromatic compound in such a way that in the end product the alkyl group is attached to the nucleus of the aromatic group, and this terminology is applied to denote catalysts that may promote this reaction indirectly, as thru the production of an intermediate product, which, on rearrangement of the atoms or groups in the molecule, etc., may produce such an end product, as well as to denote catalysts that may promote the production of such an end product directly.

I claim:

1. A process for preparing hexyl resorcinol which comprises reacting with a hexyl halogenide upon resorcinol.

2. A process for preparing hexyl resorcinol which comprises reacting with a hexyl halogenide upon resorcinol in the presence of a nuclear condensation catalyst.

3. A process for preparing hexyl resorcinol which comprises reacting with a hexyl halogenide upon resorcinol in the presence of zinc.

4. A process for preparing hexyl resorcinol which comprises reacting with hexyl chloride upon resorcinol.

5. A process for preparing hexyl resorcinol which comprises reacting with hexyl chloride upon resorcinol in the presence of a nuclear condensation catalyst.

6. A process for preparing hexyl resorcinol which comprises reacting with hexyl chloride upon resorcinol in the presence of zinc.

In testimony whereof I affix my signature.

HERMANN HIRZEL.